United States Patent
Harada

(10) Patent No.: US 9,716,848 B2
(45) Date of Patent: Jul. 25, 2017

(54) IMAGING APPARATUS AND CONTROL METHOD THEREOF

(71) Applicant: CANON KABUSHIKI KAISHA, Tokyo (JP)

(72) Inventor: Yasuhiro Harada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 62 days.

(21) Appl. No.: 14/952,107

(22) Filed: Nov. 25, 2015

(65) Prior Publication Data

US 2016/0165164 A1 Jun. 9, 2016

(30) Foreign Application Priority Data

Dec. 4, 2014 (JP) .................. 2014-245442

(51) Int. Cl.
| | |
|---|---|
| *H04N 5/357* | (2011.01) |
| *H04N 5/369* | (2011.01) |
| *H04N 5/378* | (2011.01) |
| *H04N 5/376* | (2011.01) |

(52) U.S. Cl.
CPC ........... *H04N 5/3577* (2013.01); *H04N 5/357* (2013.01); *H04N 5/3575* (2013.01); *H04N 5/3696* (2013.01); *H04N 5/378* (2013.01); *H04N 5/3765* (2013.01)

(58) Field of Classification Search
CPC .. H04N 5/23212; H04N 5/357; H04N 5/3575; H04N 5/3577; H04N 5/3696; H04N 5/3765; H04N 5/378
See application file for complete search history.

(56) References Cited

U.S. PATENT DOCUMENTS

| | | | |
|---|---|---|---|
| 6,933,978 B1 | 8/2005 | Suda | |
| 2013/0120624 A1* | 5/2013 | Okita | H04N 5/335 348/300 |
| 2014/0118587 A1* | 5/2014 | Ikedo | H04N 5/23212 348/281 |
| 2014/0192249 A1* | 7/2014 | Kishi | H04N 5/23212 348/349 |
| 2014/0284449 A1* | 9/2014 | Uchida | H04N 5/2254 250/201.2 |

(Continued)

FOREIGN PATENT DOCUMENTS

| | | |
|---|---|---|
| JP | 2001124984 A | 5/2001 |
| JP | 2010050636 A | 3/2010 |

*Primary Examiner* — Daniel M Pasiewicz
(74) *Attorney, Agent, or Firm* — Fitzpatrick, Cella, Harper & Scinto

(57) ABSTRACT

Provided is an imaging apparatus including an imaging element including a pixel unit having first and second photoelectric conversion units configured to generate image signals by photoelectrically converting optical fluxes passing through different regions into which an exit pupil of an imaging optical system is divided for one micro-lens. The imaging apparatus controls each of the timing of a first removal operation of removing a noise component from a first image signal read from the first photoelectric conversion unit and the timing of a second removal operation of removing a noise component from a second image signal read from the first and second photoelectric conversion units to have a predetermined relationship with a frequency of a noise source occurring during an operation of reading the image signals.

7 Claims, 6 Drawing Sheets

(56) References Cited

U.S. PATENT DOCUMENTS

| | | | | |
|---|---|---|---|---|
| 2014/0307134 A1* | 10/2014 | Kanda | ................ | H04N 5/23212 |
| | | | | 348/280 |
| 2014/0320690 A1* | 10/2014 | Kobayashi | ........ | H01L 27/14609 |
| | | | | 348/222.1 |
| 2014/0320735 A1* | 10/2014 | Ikedo | ................... | H04N 5/3696 |
| | | | | 348/350 |
| 2016/0006917 A1* | 1/2016 | Endo | .................... | H04N 5/2352 |
| | | | | 348/296 |

* cited by examiner

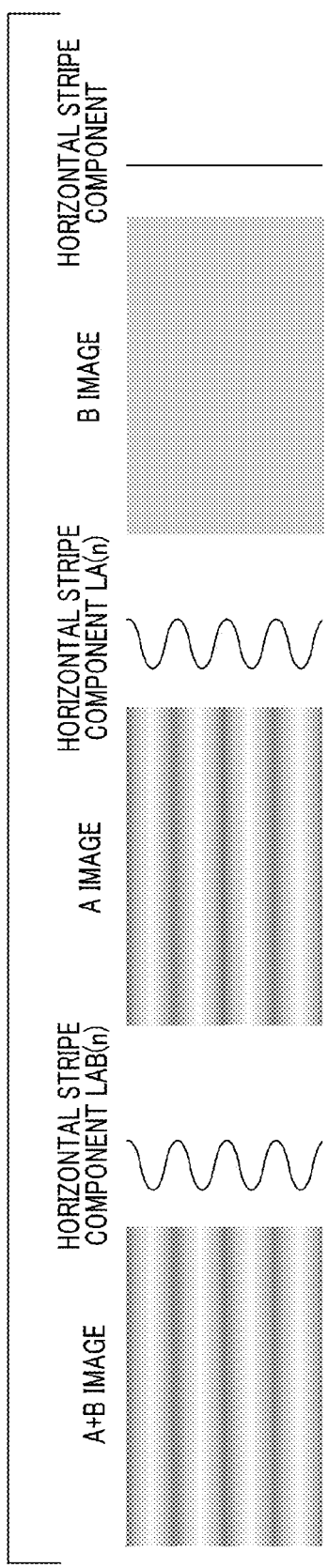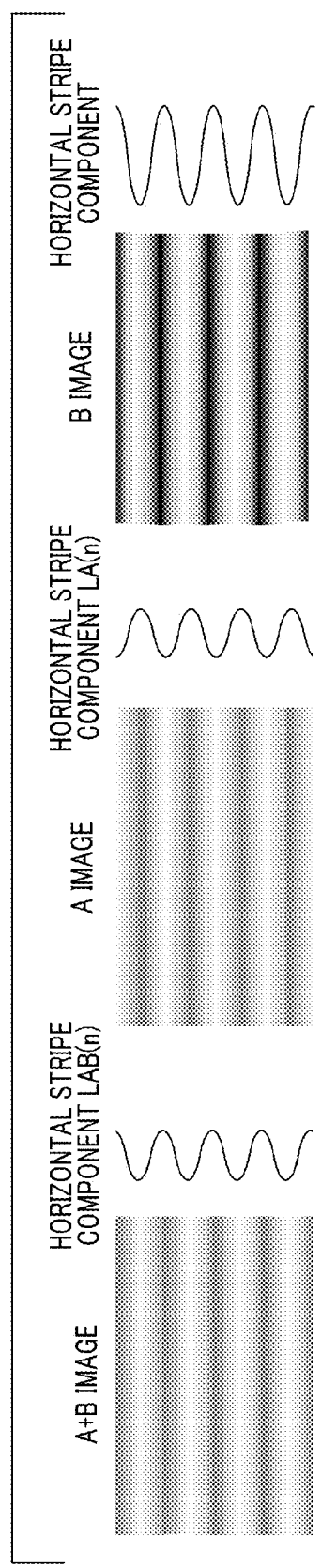

IMAGING APPARATUS AND CONTROL METHOD THEREOF

BACKGROUND OF THE INVENTION

Field of the Invention

The present invention relates to an imaging apparatus and a control method thereof.

Description of the Related Art

Imaging apparatuses for performing shooting using a solid-state imaging element such as a charge-coupled device (CCD) sensor, a complementary metal-oxide-semiconductor (CMOS) image sensor, or the like are being proposed. In the imaging apparatuses, various noises that cause image quality deterioration occur in a process in which an imaging element converts an optical image into an electric signal. Representative noise is reset noise of a pixel and a read circuit and random noise which changes every time an imaging operation is performed such as a dark current occurring in a pixel region. In addition, the imaging apparatus has a large number of elements which may serve as noise sources that periodically change a power supply voltage of the imaging element inside the imaging apparatus or in the vicinity of the imaging apparatus. When the noise sources operate during signal reading of the imaging element, the power supply voltage supplied to the imaging element changes due to a change in a power supply or electromagnetic waves. Because the noise sources are driven at a specific frequency for each device and each component, the power supply voltage of the imaging element periodically changes and the noise appears as noise of a periodic horizontal stripe shape in an image.

In Japanese Patent Laid-Open No. 2010-50636, an imaging apparatus for reducing horizontal stripe noise by changing a frequency of a noise source and a driving timing at which the imaging element is driven with respect to horizontal stripe noise due to the noise source which periodically changes is disclosed. In addition, in Japanese Patent Laid-Open No. 2001-124984, an imaging apparatus including an imaging element having two photodiodes (PDs) in one pixel is disclosed.

It is possible to obtain an A image signal obtained from the first PD and an A+B image signal obtained from the first and second PDs using an imaging apparatus of Japanese Patent Laid-Open No. 2001-124984. The A+B image signal can be used in a captured image signal. In addition, it is possible to obtain a B image signal according to a difference between the A+B image signal and the A image signal and detect a focus state based on a phase difference between the obtained B image signal and the A image signal.

In the imaging apparatus disclosed in Japanese Patent Laid-Open No. 2001-124984, it is necessary to perform reading of the captured image signal and reading of the focus state detection signal in time series. At this time, when the noise source for periodically changing the power supply voltage of the imaging element operates, horizontal stripe noise also occurs in the focus state detection signal in addition to the captured image signal. Accordingly, when the horizontal stripe noise occurs in the focus state detection signal, the accuracy of focus state detection is degraded. Because signal reading of the imaging element in which two PDs are provided in the pixel is not considered in the imaging apparatus disclosed in Japanese Patent Laid-Open No. 2010-50636, it is difficult to reduce horizontal stripe noise for both the captured image signal and the focus state detection signal.

SUMMARY OF THE INVENTION

The present invention enables horizontal stripe noise to be reduced for both a captured image signal and a focus state detection signal.

According to an embodiment of the present invention, an imaging apparatus includes an imaging element including a pixel unit having first and second photoelectric conversion units configured to generate image signals by photoelectrically converting optical fluxes passing through different regions into which an exit pupil of an imaging optical system is divided for one micro-lens; and a controller configured to read the image signals from the photoelectric conversion units provided in the pixel unit. The controller controls a timing of a first removal operation of removing a noise component from a first image signal read from the first photoelectric conversion unit and a timing of a second removal operation of removing a noise component from a second image signal read from the first and second photoelectric conversion units to have a predetermined relationship with a frequency of a noise source occurring during an operation of reading the image signals.

Further features of the present invention will become apparent from the following description of exemplary embodiments (with reference to the attached drawings).

BRIEF DESCRIPTION OF THE DRAWINGS

FIGS. 6A and 6B are diagrams illustrating an influence of noise of a horizontal stripe in a B image signal.

DESCRIPTION OF THE EMBODIMENTS (Embodiment 1)

Figure 1:
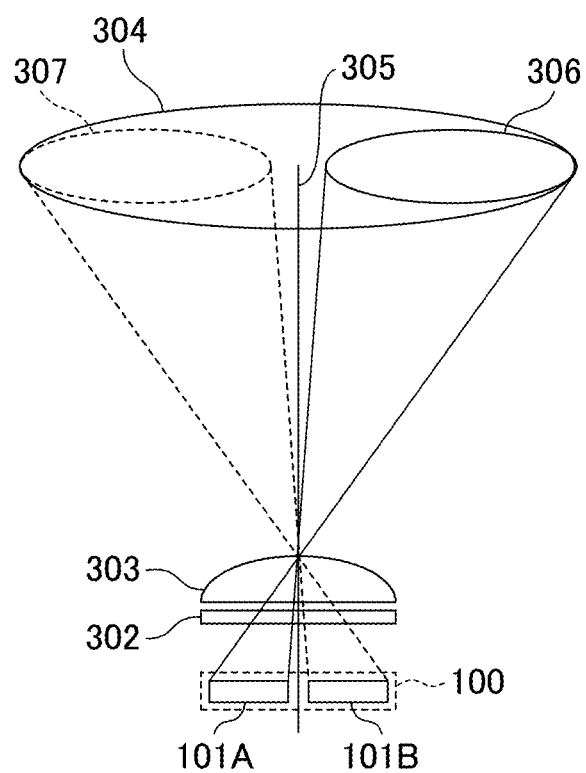
FIG. 1 is a diagram illustrating focus detection based on a pupil division scheme.

FIG. 1 is a diagram illustrating focus detection based on a pupil division scheme according to an imaging apparatus of this embodiment.

In FIG. 1, a state in which an optical flux output from an exit pupil of an imaging lens provided in the imaging apparatus is incident on a unit pixel of an imaging element is illustrated. Reference sign 100 denotes the unit pixel and the unit pixel 100 has a first PD 101A and a second PD 101B. Reference sign 302 denotes a color filter. Reference sign 303 denotes a micro-lens. Reference sign 304 denotes the exit pupil of the imaging lens.

For the pixel having the micro-lens 303, the center of an optical flux output from the exit pupil is designated as an optical axis 305. Light passing through the exit pupil is incident on the unit pixel 100 around the optical axis 305. Reference signs 306 and 307 denote some regions of the exit pupil of the imaging lens.

As illustrated in FIG. 1, the optical flux passing through the pupil region 306 is received by the PD 101A through the micro-lens 303 and the optical flux passing through the pupil region 307 is received by the PD 101B through the micro-lens 303. Accordingly, the PDs 101A and 101B receive light of different regions of the exit pupil of the imaging lens. That is, the imaging element has a pixel unit having first and second photoelectric conversion units configured to generate image signals by photoelectrically converting optical fluxes passing through the different regions into which the exit pupil of an imaging optical system is divided for one micro-lens. It is possible to detect a phase difference by comparing signals of the PDs 101A and 101B.

A signal obtained from the PD 101A is defined as an A image signal and a signal obtained from the PD 101B is defined as a B image signal. A signal obtained by adding the A image signal and the B image signal is defined as an A+B image signal. The A+B image signal becomes a captured image signal.

Figure 2:
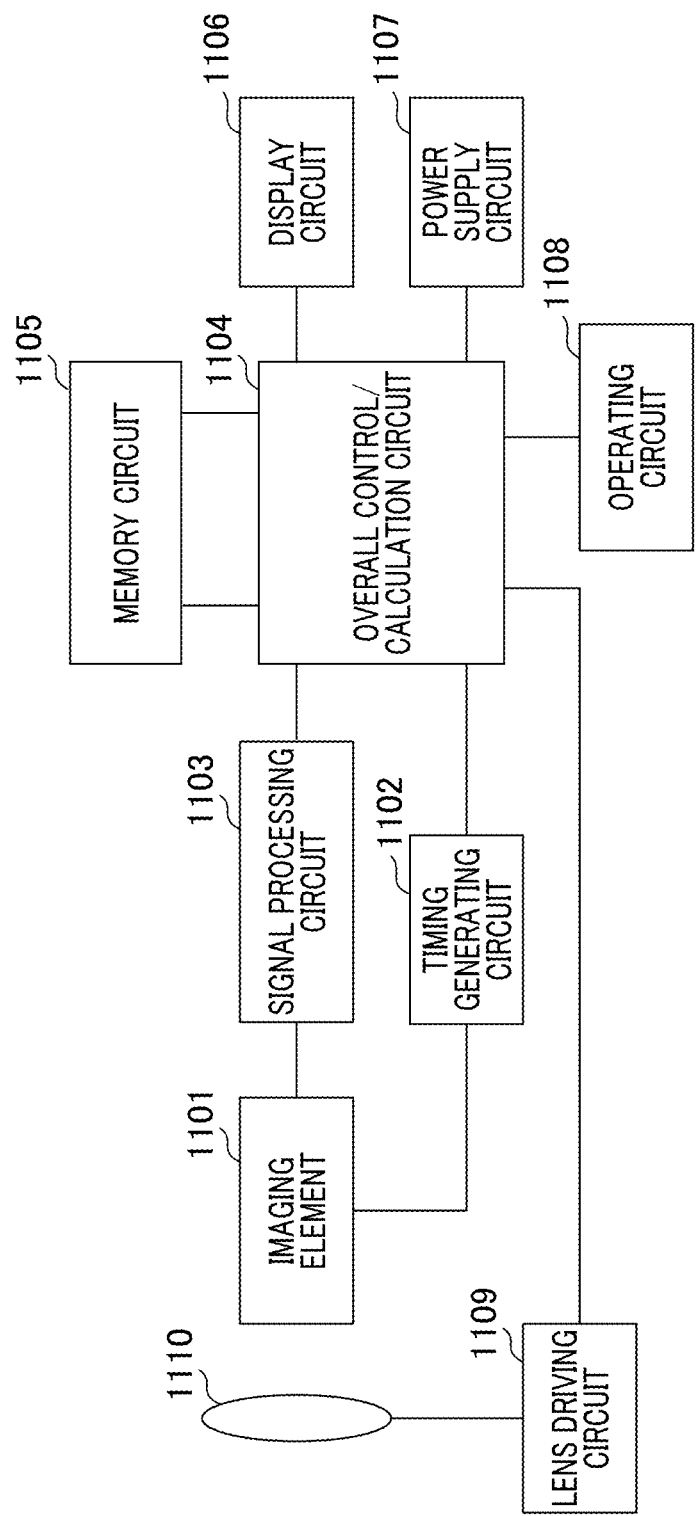
FIG. 2 is an overall block diagram of an imaging apparatus.

FIG. 2 is an overall block diagram of the imaging apparatus of this embodiment.

The imaging apparatus includes an imaging lens 1110 to a lens driving circuit 1109. The imaging lens 1110 forms an optical image of a subject on an imaging element 1101. The lens driving circuit 1109 drives the imaging lens 1110 to perform zoom control, focus control, diaphragm control, etc.

The imaging element 1101 captures the subject of the image formed on the imaging lens 1110 as an image signal. In the imaging element 1101, unit pixels 100 illustrated in FIG. 1 are disposed in an array shape. A signal processing circuit 1103 performs various types of correction on the image signal output by the imaging element 1101 or compresses data.

In addition, the signal processing circuit 1103 also generates the B image signal from the A image signal and the A+B image signal read from the imaging element 1101. The overall control/calculation circuit 1104 can detect the focus state based on the phase difference between the A image signal and the B image signal. The timing generation circuit 1102 outputs a driving timing signal to the imaging element 1101.

The overall control/calculation circuit 1104 controls the overall imaging apparatus. A memory circuit 1105 temporarily stores image data. A display circuit 1106 displays various types of information or a captured image. An operating circuit 1108 electrically receives an operation input of a user using an operating member provided in the imaging apparatus.

A power supply circuit 1107 has a direct current (DC)/DC circuit configured to convert a voltage supplied from a battery or the like into a desired voltage and supplies each part with a voltage necessary in the imaging apparatus for a necessary time. The DC/DC circuit is driven based on a DC/DC driving clock CLK_DCDC.

In the imaging apparatus illustrated in FIG. 2, the DC/DC circuit for performing voltage conversion, the lens driving circuit for driving an actuator used for the lens and a diaphragm, etc. are provided. That is, the imaging apparatus has a large number of elements which may serve as noise sources for periodically changing a power supply voltage of the imaging element inside the imaging apparatus or in the vicinity of the imaging apparatus. When the noise sources operate during signal reading of the imaging element, the power supply voltage supplied to the imaging element changes due to a change in a power supply or electromagnetic waves. Because the noise sources are driven at a specific frequency for each device and each component, the power supply voltage of the imaging element periodically changes and the noise appears as periodic horizontal stripe noise in an image.

Figure 3:
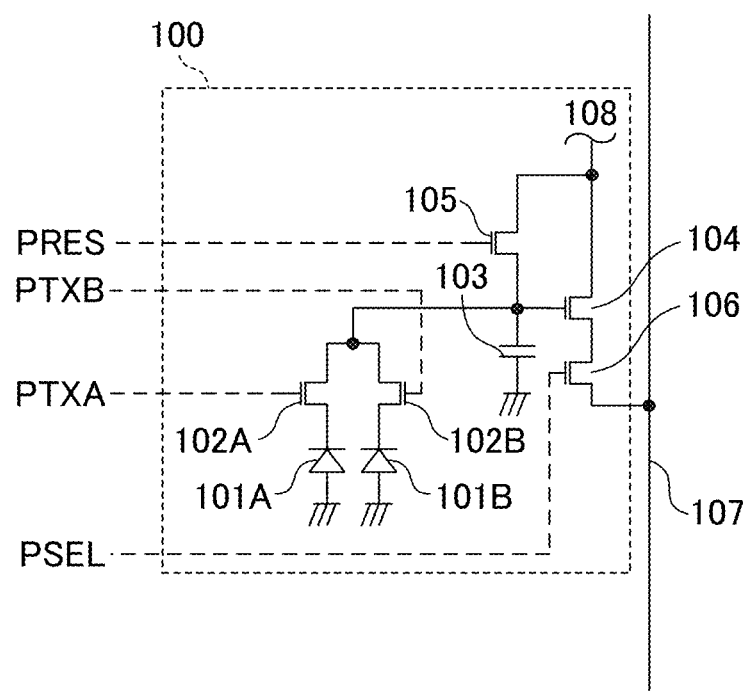
FIG. 3 is an example of a circuit diagram of a unit pixel of an imaging element.

FIG. 3 is an example of a circuit diagram of a unit pixel of the imaging element.

The unit pixel 100 includes the first PD 101A, the second PD 101B, a first transfer switch 102A, and a second transfer switch 102B. In addition, the unit pixel 100 includes a floating diffusion region 103, an amplification unit 104, a reset switch 105, and a selection switch 106.

The PDs 101A and 101B function as photoelectric conversion units configured to receive light passing through the same micro-lens and generate signal charges according to an amount of the received light. The transfer switches 102A and 102B transfer electric charges generated by the PDs 101A and 101B to the common floating diffusion region 103. The transfer switches 102A and 102B are controlled according to transfer pulse signals PTXA and PTXB, respectively.

The floating diffusion region 103 functions as a charge voltage conversion unit configured to temporarily holding electric charges transmitted from the PDs 101A and 101B and converting the held electric charges into a voltage signal. The amplification unit 104 is a source follower MOS transistor and amplifies a voltage signal based on the electric charges held in the floating diffusion region 103 to output the amplified voltage signal as a pixel signal. The reset switch 105 is controlled according to a reset pulse signal PRES and resets a potential of the floating diffusion region 103 to a reference potential VDD. The selection switch 106 is controlled according to a vertical selection pulse signal PSEL and outputs the pixel signal amplified by the amplification unit 104 to a vertical output line 107. Also, VDD 108 is a common power supply.

Figure 4:
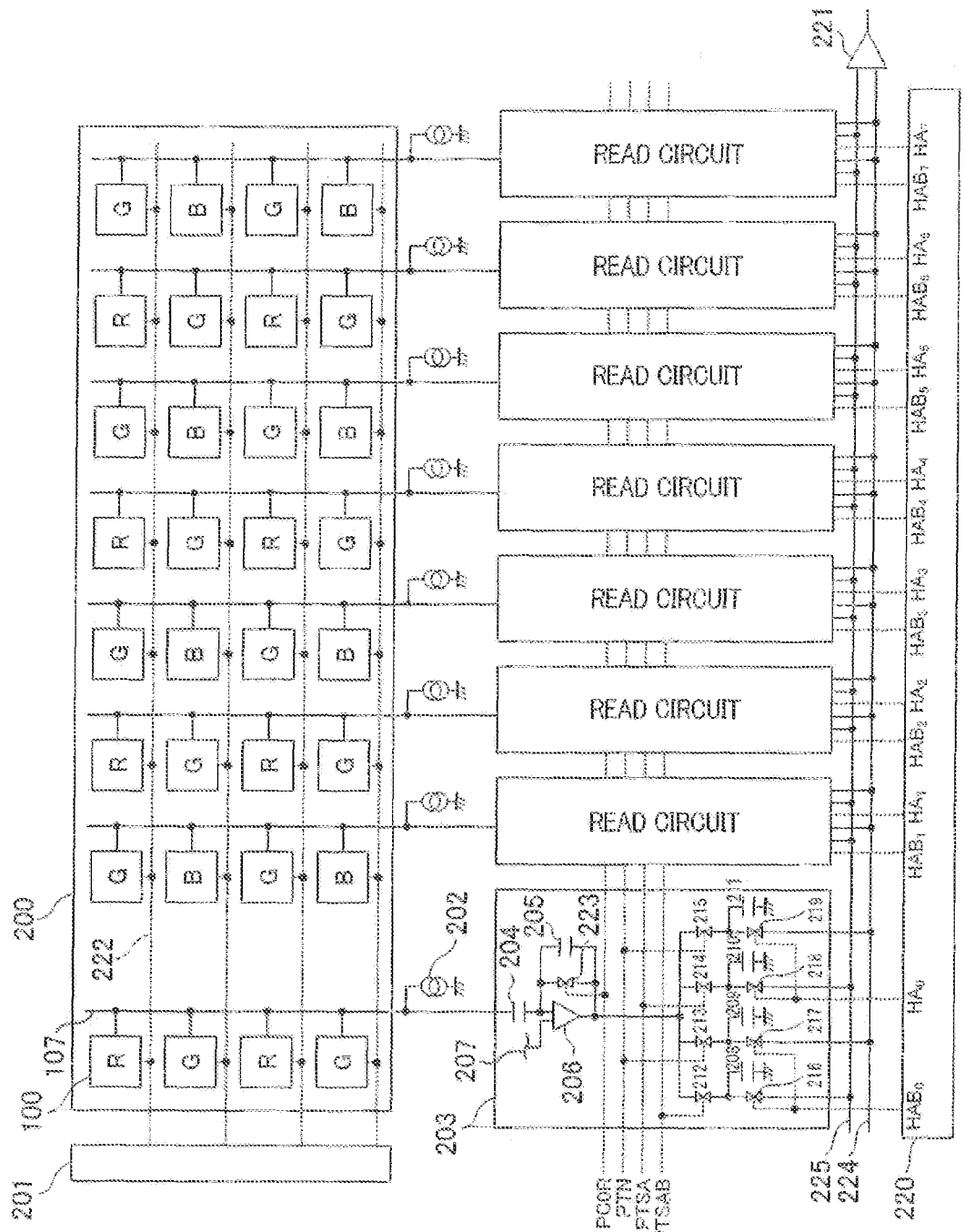
FIG. 4 is a diagram illustrating an example of a read circuit of the imaging element.

FIG. 4 is a diagram illustrating an example of a read circuit of the imaging element.

In a pixel region 200, a plurality of unit pixels 100 are disposed in a matrix shape. Also, the unit pixels are shown as 8×4 pixels in order to simplify description, but the actual number of pixels is larger. In addition, color filters of a plurality of colors are provided in the unit pixels 100. A pixel in which a red color filter is provided and which images red light is described as an R pixel. A pixel in which a green color filter is provided and which images green light is described as a G pixel. In addition, a pixel in which a blue color filter is provided and which images blue light is described as a B pixel. The pixels having the above-described three color filters are disposed in a Bayer array.

Reference sign 201 denotes a vertical shift register, and a driving pulse is sent to one pixel of each row through a driving signal line 222. One driving signal line 222 for each row is illustrated for simplification, but a plurality of driving signal lines are actually connected to each row. Unit pixels 100 of the same column are connected to a common vertical output line 107 and a signal from each pixel is input to a common read circuit 203 via the vertical output line 107. A signal processed by the read circuit 203 is sequentially output to an output amplifier 221 according to a horizontal shift register 220. Reference sign 202 denotes a current source load connected to the vertical output line 107.

Next, a specific circuit configuration of the read circuit 203 will be described. Reference sign 204 denotes a clamp capacitor C0. Reference sign 205 denotes a feedback capacitor Cf. Reference sign 206 denotes an operational amplifier. Reference sign 207 denotes a reference voltage source for supplying a reference voltage Vref. Reference sign 223 denotes a switch for shorting both ends of the feedback capacitor Cf. The switch 223 is controlled by a PC0R signal. Reference signs 208, 209, 210, and 211 are capacitors for holding a signal voltage. Reference sign 208 denotes a capacitor CTSAB, reference sign 210 denotes a capacitor CTSA, and reference signs 209 and 211 denote capacitors CTN. Reference signs 212, 213, 214, and 215 denote switches for controlling writing to the capacitors. The switch 212 is controlled by a PTSAB signal and the switch 214 is controlled by a PTSA signal.

The switches 213 and 215 are controlled by a PTN signal. Reference signs 216, 217, 218, and 219 denote switches for receiving a signal from the horizontal shift register 220 to output the signal to the output amplifier 221. The switches 216 and 217 are controlled by an HAB(m) signal of the horizontal shift register 220. In addition, the switches 218 and 219 are controlled by an HA(m) signal. The "m" denotes a column number of the read circuit to which a control signal line is connected.

Signals written to the capacitor CTSAB 208 and the capacitor CTSA 210 are output to the output amplifier 221 via a common output line 225. In addition, signals written to the capacitors CTN 209 and 211 are output to the output amplifier 221 via a common output line 224.

Figure 5:
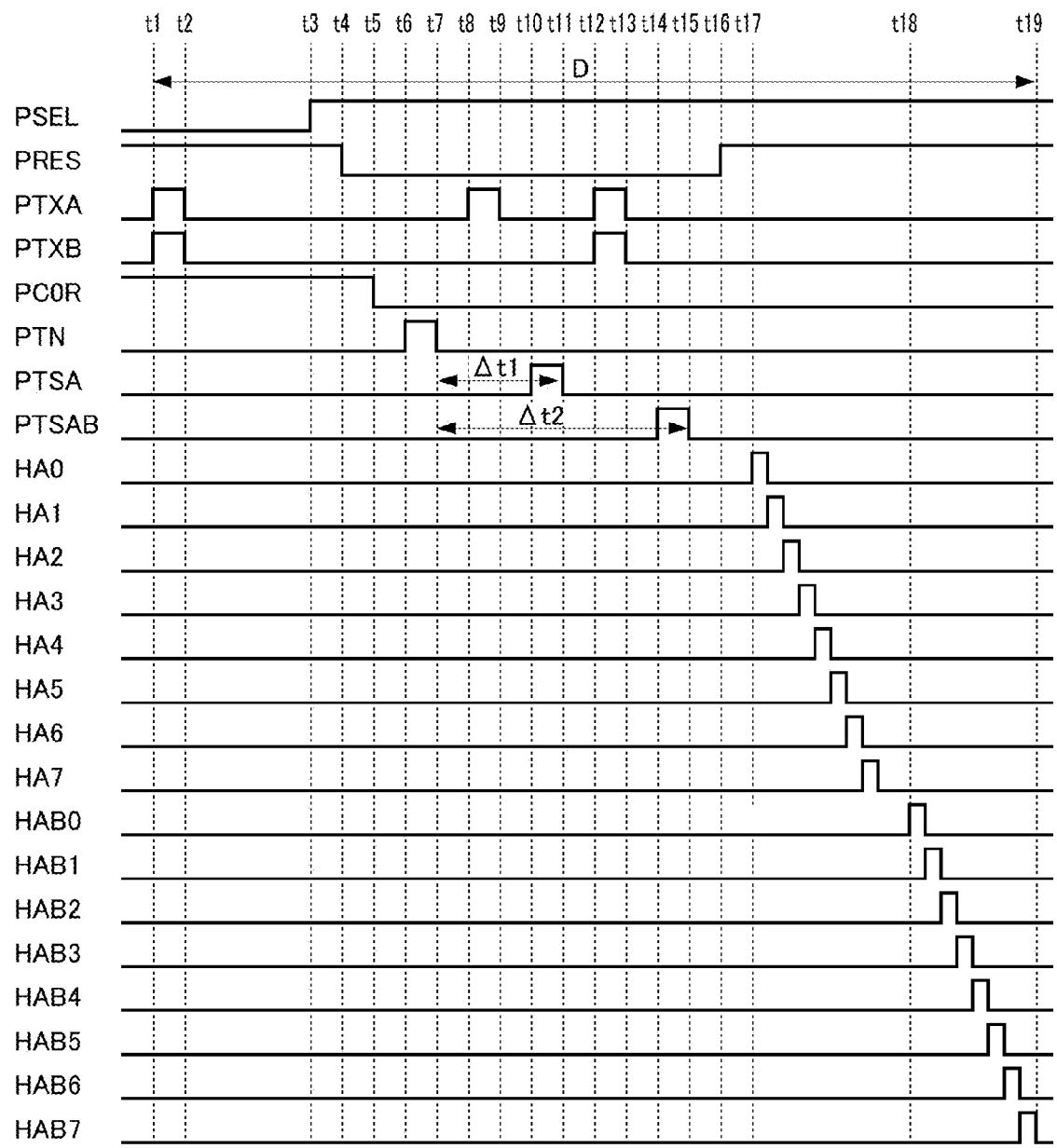
FIG. 5 is a diagram illustrating driving control and timings for reading a pixel signal.

FIG. 5 is a diagram illustrating driving control and timings for reading a pixel signal in this embodiment.

The overall control/calculation circuit 1104 (FIG. 2) provided in the imaging apparatus executes driving control illustrated in FIG. 5. At time T=t1, PTXA and PTXB which are control signals of the transfer switches 102A and 102B are set to high (H) and the PDs 101A and 101B are reset. At time T=t2, PTXA and PTXB are set to low (L) and optical charges start to be stored in the PDs 101A and 101B. After storage for a necessary time, at T=t3, PSEL which is a control signal of the selection switch 106 is set to H and the amplification unit 104 is turned ON. At T=t4, PRES which is a control signal of the reset switch 105 is set to L, so that the reset of the floating diffusion region 103 is released. At this time, the potential of the floating diffusion region 103 is read as a reset signal level to the vertical output line 107 via the amplification unit 104 and input to the read circuit 203.

In the read circuit 203, the reset signal level is input in a state in which the operational amplifier 206 buffers an output of a reference voltage Vref (a state in which PC0R is H and the switch 223 is turned ON). Thereafter, PC0R is set to L at T=t5. In order to write an output of Vref at T=t5 to the capacitors CTN 209 and 211, PTN is set to H at T=t6 and therefore the switches 213 and 215 are turned ON. Then, PTN is set to L at T=t7, so that the switches 213 and 215 are turned OFF and writing ends. Next, PTXA is set to H at T=t8 and therefore optical charges of the PD 101A are transferred to the floating diffusion region 103 and PTXA is set to L at T=t9. According to this operation, electric charges stored in the PD 101A are read to the floating diffusion region 103. Then, an output according to this change is supplied to the read circuit 203 via the amplification unit 104 and the vertical output line 107.

In the read circuit 203, an inverted gain is applied and output for a voltage change at a capacitance ratio of the feedback capacitor Cf 205 to the clamp capacitor C0 204. In order to write the voltage of the inverted gain to the capacitor CTSA 210, PTSA is switched from the L level to the H level at T=t10, the switch 214 is turned ON, and PTSA is switched from the H level to the L level at T=t11, the switch 214 is turned OFF, and writing ends.

Next, at T=t12, PTXB is set to H simultaneously when PTXA is set to H again. According to this operation, it is possible to simultaneously read optical charges of both the PDs 101A and 101B to the floating diffusion region 103. After the optical charges are read to the floating diffusion region 103, PTXA and PTXB are switched from the H level to the L level at T=t13. The read electric charges are supplied to the read circuit 203 and output via the operational amplifier like when only the PD 101A is read. In order to write the voltage of the supplied electric charges to the capacitor CTSAB, PTSAB is switched from the L level to the H level at T=t14 and the switch 212 is turned ON. In addition, PTSAB is switched from the H level to the L level at T=t15, the switch 212 is turned OFF, and writing ends.

According to this operation, an A+B image signal which is a sum of output signals from the PDs 101A and 101B is obtained by taking a difference voltage between the capacitor CTSAB 208 and the capacitor CTN 209. The A+B image signal becomes a captured image. In addition, an A image signal which is an output signal from the PD 101A is obtained by taking a difference voltage between the capacitor CTSA 210 and the capacitor CTN 211. Information of an optical flux penetrating part of a pupil of the imaging lens is obtained from the A image signal. A B image signal which is an output signal from the PD 101B is obtained by taking a difference between the A+B image signal and the A image signal. Information of an optical flux penetrating a different pupil region from the A image signal is obtained from the B image signal. It is possible to obtain distance information from the information of the two optical fluxes.

Next, PRES is set to H at T=t16 and the floating diffusion region 103 is in a reset state. Thereafter, for signals held in the capacitor CTSA 210 and the capacitor CTN 211, a driving pulse HA(m) of the horizontal shift register 220 sequentially becomes L, H, and L for each read circuit between T=t17 and T=T18. Accordingly, the switches 218 and 219 are sequentially turned OFF, ON, and OFF. Signals held in the capacitor CTSA 210 and the capacitor CTN 211 of a column for which the switches 218 and 219 are sequentially turned OFF, ON, and OFF are read to the common output lines 225 and 224 and output as a difference voltage by the output amplifier 221. The difference voltage serves as the A image signal.

Next, between T=t18 and T=t19, a driving pulse HAB(m) of the horizontal shift register 220 sequentially becomes L, H, and L for each read circuit. Accordingly, the switches 216 and 217 are sequentially turned OFF, ON, and OFF. Signals held in the capacitor CTSAB 208 and the capacitor CTN 209 of a column for which the switches 216 and 217 are sequentially turned OFF, ON, and OFF are read to the common output lines 225 and 224, respectively, and output as a difference voltage by the output amplifier 221. This difference voltage becomes the A+B image signal. The above operation is sequentially performed for every row and reading of the A image signal and the A+B image signal is completed. The B image signal can be obtained by taking a difference between the output A image signal and the A+B image signal corresponding to the A image signal. Therefore, a focus detection operation from the A image signal and the B image signal is possible.

Next, an influence of the case in which periodically changed noise is mixed during the imaging/reading operation described above will be described. Also, an example of a switching operation of the DC/DC converter of the power supply circuit 1107 as a noise source which periodically changes inside the imaging apparatus has been described above, but the noise source is not limited to the DC/DC converter.

A driving frequency of the driving clock CLK_DCDC of the DC/DC converter becomes f(MHz). The case in which noise of f(MHz) is mixed at the reading time of the imaging element according to the influence of the DC/DC driving is considered.

The influence of the case in which the noise of the sinusoidal wave of the frequency f and an initial phase θ expressed by the following Formula (1) is mixed at the reading time of the imaging element will be described.
[Math 1]

$$y(t)=\sin(2\pi ft+\theta) \quad \text{Formula (1)}$$

In Formula (1), t represents time.

In FIG. 5, one horizontal period corresponding to a period from t1 to t19 is designated as D. In addition, a time difference between a timing t7 at which PTN becomes L and the reset level is held in the holding capacitor CTN (209) and a timing t11 at which PTSA becomes L and an image signal (an A image signal for focus detection) of the PD 101A is held in the holding capacitor CTSA is designated as Δt1. Δt1 corresponds to the timing of a first removal operation of removing a noise component from a first image signal (an A image signal) read from the PD 101A. In other words, Δt1 corresponds to a time difference between the timing at which the first image signal to be used in the first removal operation is acquired and the timing at which the noise component to be used in the first removal operation is acquired.

In addition, a time difference between the timing t7 at which the reset level is held and a timing t15 at which PTSAB becomes L and an A+B image signal for a captured image which is a sum of output signals from the PDs 101A and 101B is held in the holding capacitor CTSAB is designated as Δt2. Δt2 corresponds to the timing of a second removal operation of removing the noise component from a second image signal (A+B image signal) read from the PDs 101A and 101B. In other words, Δt2 corresponds to a time difference between the timing at which the second image signal to be used in the second removal operation is acquired and the timing at which the noise component to be used in the second removal operation is acquired.

When influences at difference detection times of an $n^{th}$ row of noise signals of the frequency f mixed at times of the read operations on the A image signal for the focus detection and the A+B image signal for the captured image are designated as LA(n) and LAB(n), respectively, LA(n) and LAB(n) are expressed by Formulas (2) and (3).
[Math 2]

$$LA(n)=\sin(2\pi f(Hn+\Delta t1)+\theta)-\sin(2\pi fHn+\theta) \quad \text{Formula (2)}$$

$$LAB(n)=\sin(2\pi f(Hn+\Delta t2)+\theta)-\sin(2\pi fHn+\theta) \quad \text{Formula (3)}$$

In addition, Formulas (2) and (3) are modified to Formulas (4) and (5) using a triangular function formula.
[Math 3]

$$LA(n)=2\times\cos(\pi f(2Hn+\Delta t1)+\theta)\times\sin(\pi f\Delta t1) \quad \text{Formula (4)}$$

$$LAB(n)=2\times\cos(\pi f(2Hn+\Delta t2)+\theta)\times\sin(\pi f\Delta t2) \quad \text{Formula (5)}$$

From Formulas (4) and (5), LA(n) and LAB(n) change according to a value of a row number n and noise of a horizontal stripe shape occurs when a noise source of the noise frequency f and the initial phase θ is mixed during a read operation.

The overall control/calculation circuit 1104 provided in the imaging apparatus of Embodiment 1 controls the A image signal for the focus detection so that Δt1 satisfies Formula (6).
[Math 4]

$$\Delta t1=k1/f \quad k1=\text{integer} \quad \text{Formula (6)}$$

When Δt1 satisfies Formula (6), a value of Formula (4) becomes zero and the influence of the noise signal of the frequency f after difference detection is suppressed. That is, horizontal stripe noise occurring in the A image signal can be suppressed.

In addition, the overall control/calculation circuit 1104 controls the A+B image signal for the captured image so that Δt2 satisfies Formula (7).
[Math 5]

$$\Delta t2=k2/f \quad k2=\text{integer} \quad \text{Formula (7)}$$

Because a value of Formula (5) becomes zero when Δt2 satisfies Formula (7) and the influence of the noise signal of the frequency f after difference detection is suppressed, the influence of horizontal stripe noise occurring in the A+B image signal can be suppressed.

That is, the overall control/calculation circuit 1104 controls Δt1 and Δt2 to have a predetermined relationship with a frequency of a noise source occurring during an operation of reading the image signal. Specifically, the overall control/calculation circuit 1104 controls each of Δt1 and Δt2 to be an integer multiple of a reciprocal of the frequency of the noise source. Thereby, it is also possible to suppress the influence of the noise signal of the frequency f on the B image signal calculated from the difference between the A+B image signal and the A image signal. As a result, it is possible to suppress image quality degradation of the A+B image signal for the captured image due to a periodic noise change. Further, in the focus detection operation to be performed using the A image signal and the B image signal for the focus detection, it is possible to reduce the influence of the horizontal stripe noise and suppress the degradation of focus detection accuracy.

(Embodiment 2)

Next, Embodiment 2 will be described. The imaging apparatus of Embodiment 1 sets an optimum timing for each of the reading timing Δt2 of the A+B image signal for the captured image and the reading timing Δt1 for the focus detection. However, when Δt1 and Δt2 are set to optimum timings, one horizontal period D is lengthened and the reading time is extended. According to a continuous shooting speed of a still image or a video frame rate, an allowable read time is constrained and the setting to the optimum timings shown in Embodiment 1 is difficult.

An imaging apparatus of Embodiment 2 is configured to avoid the influence of periodic noise as much as possible and also suppress an increase in the reading time.

In Embodiment 2, Formulas (4) and (5) shown in Embodiment 1 are modified to Formulas (8) and (9).
[Math 6]

$$LA(n)=2\times\cos(\pi f(2Hn)+\pi f\Delta t1+\theta)\times\sin(\pi f\Delta t1) \quad \text{Formula (8)}$$

$$LAB(n)=2\times\cos(\pi f(2Hn)+\pi f\Delta t2+\theta)\times\sin(\pi f\Delta t2) \quad \text{Formula (9)}$$

From Formulas (8) and (9), a phase θA of horizontal stripe noise of the A image signal and a phase θAB of horizontal stripe noise of the A+B image signal are expressed by Formulas (10) and (11), respectively.
[Math 7]

$$\theta A=\pi f\Delta t1+\theta \quad \text{Formula (10)}$$

$$\theta AB=\pi f\Delta t2+\theta \quad \text{Formula (11)}$$

In addition, amplitude GA of the horizontal stripe noise of the A image signal and amplitude GAB of horizontal stripe noise of the A+B image signal are expressed by Formulas (12) and (13), respectively.
[Math 8]

$$GA=2\times|\sin(\pi f\Delta t1)| \quad \text{Formula (12)}$$

$$GAB=2\times|\sin(\pi f\Delta t2)| \quad \text{Formula (13)}$$

From Formulas (10) and (11), phases θA and θAB of the horizontal stripe noise are determined by an initial phase θ of a noise source, a frequency f, the reading timing Δt2 of the A+B image signal, and the reading timing Δt1 of the A image signal.

Here, a B image signal for focus detection is acquired by a difference between the A+B image signal and the A image signal, and horizontal stripe noise of the B image signal becomes a difference LAB(n)−LA(n) between horizontal stripe noise of the A+B image signal and horizontal stripe noise of the A image signal. Accordingly, the horizontal stripe noise of the B image signal may be amplified or reduced according to a phase relationship of the horizontal stripe noise of the A+B image signal and the A image signal.

FIG. 6 is a diagram illustrating an influence of horizontal stripe noise in the B image signal according to a phase relationship between the horizontal stripe noise of the A+B image signal and the horizontal stripe noise of the A image signal.

The phase of the horizontal stripe noise of the A+B image signal is described as θAB and the phase of the horizontal stripe noise of the A image signal is described as θA. In addition, horizontal stripe components of the A image signal and the A+B image signal obtained according to Formulas (8) and (9) are described as LA(n) and LAB(n).

FIG. 6A illustrates the case in which a phase difference between θA and θAB becomes 0. At this time, when the amplitudes GA and GAB of the horizontal stripe noise indicated by Formulas (12) and (13) are identical, LA(n)=LAB(n) and the horizontal stripe component of the B image becomes zero.

Here, even when GA and GAB are not identical, the amplitude of the horizontal stripe noise of the B image signal can be suppressed to a value less than the amplitude of the horizontal stripe noise of the A+B image signal and the amplitude of the horizontal stripe noise of the A image signal if LA(n) and LAB(n) are in same phase.

FIG. 6B illustrates the case in which a phase difference between θA and θ is π, that is, the case in which θ2=θ1+π. At this time, when the amplitudes GA and GAB of the horizontal stripe noise shown in Formulas (12) and (13) are identical, LA(n)=−LAB(n) and the horizontal stripe component of the B image becomes a horizontal stripe having amplitude twice those of the A image and the A+B image.

Even when GA and GB are not identical, the amplitude of the horizontal stripe noise of the B image signal has a value greater than the amplitude of the horizontal stripe noise of the A+B image signal and the amplitude of the horizontal stripe noise of the A image signal because LA(n) and LAB(n) are inverted phase. Therefore, the imaging apparatus controls the phase so that the phase difference between θA and θAB becomes zero. Thereby, it is possible to control the amplitude of the horizontal stripe noise of the B image signal.

The condition under which the phase difference becomes zero is θA=θAB+2Nπ and becomes the condition of Formula (14) from Formulas (10) and (11).

[Math 9]

$$\Delta t2 = \Delta t1 + 2N/f, \text{ where } N \text{ is an integer} \quad \text{Formula (14)}$$

The overall control/calculation circuit 1104 provided in the imaging apparatus determines the reading timing Δt2 of the A+B image signal for the captured image and the reading timing Δt1 for the focus detection to satisfy Formula (14). That is, the overall control/calculation circuit 1104 controls a difference between the timing of a first removal operation and the timing of a second removal operation to be an even number multiple of a reciprocal of a frequency of a noise source. Thereby, it is possible to suppress the amplitude of the horizontal stripe noise of the B image signal.

Here, it is difficult to suppress amplitudes of horizontal stripe noise of the A image signal and the A+B image signal only by satisfying Formula (14). Accordingly, the imaging apparatus determines Δt1 and Δt2 so that the amplitudes of the horizontal stripe noise shown in Formulas (12) and (13) are less than or equal to a threshold value. Thereby, it is possible to suppress the amplitude of the horizontal stripe noise of any one of the A image signal, the A+B image signal, and the B image signal. As a result, it is possible to prevent image quality degradation of a captured image and degradation of focus detection accuracy.

Further, because it is possible to mitigate the constraint for the reading timing Δt2 of the A+B image signal for the captured image and the reading timing Δt1 for the focus detection more than the constraint in the case of Embodiment 1, it is also possible to suppress an increase of a reading time as compared with Embodiment 1. While embodiments of the present invention have been described, the present invention is not limited to these embodiments.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-245442, filed Dec. 4, 2014, which is hereby incorporated by reference herein in its entirety.

What is claimed is:
1. An imaging apparatus comprising:
an imaging element including a pixel unit having first and second photoelectric conversion units configured to generate image signals by photoelectrically converting optical fluxes passing through different regions into which an exit pupil of an imaging optical system is divided for one micro-lens; and a controller configured to read the image signals from the photoelectric conversion units provided in the pixel unit, wherein the controller controls a timing of a first removal operation of removing a noise component from a first image signal read from the first photoelectric conversion unit and a timing of a second removal operation of removing a noise component from a second image signal read from the first and second photoelectric conversion units to have a predetermined relationship with a frequency of a noise source occurring during an operation of reading the image signals.

2. The imaging apparatus according to claim 1, wherein the controller controls each of the timing of the first removal operation and the timing of the second removal operation to be an integer multiple of a reciprocal of the frequency of the noise source.

3. The imaging apparatus according to claim 1, wherein the controller controls a phase difference between a phase of horizontal stripe noise of the first image signal read from the first photoelectric conversion unit and a phase of horizontal stripe noise of the second image signal read from the first and second photoelectric conversion units to be zero.

4. The imaging apparatus according to claim 3, wherein the controller controls a difference between the timing of the first removal operation and the timing of the second removal operation to be an even number multiple of a reciprocal of the frequency of the noise source.

5. The imaging apparatus according to claim 3, wherein the controller controls amplitude of the horizontal stripe noise of the first image signal read from the first photoelectric conversion unit and amplitude of the horizontal stripe noise of the second image signal read from the first and second photoelectric conversion units to be less than or equal to a threshold value.

6. The imaging apparatus according to claim 1, wherein the timing of the first removal operation corresponds to a time difference between a timing at which the controller acquires the first image signal for use in the first removal operation and a timing at which the controller acquires the noise component for use in the first removal operation, and wherein the timing of the second removal operation corresponds to a time difference between a timing at which the controller acquires the second image signal for use in the second removal operation and a timing at which the controller acquires the noise component for use in the second removal operation.

7. A control method of an imaging apparatus including an imaging element including a pixel unit having first and second photoelectric conversion units configured to generate image signals by photoelectrically converting optical fluxes passing through different regions into which an exit pupil of an imaging optical system is divided for one micro-lens, the method comprising:

controlling to read the image signals from the photoelectric conversion units provided in the pixel unit, wherein, in the controlling, a timing of a first removal operation of removing a noise component from a first image signal read from the first photoelectric conversion unit and a timing of a second removal operation of removing a noise component from a second image signal read from the first and second photoelectric conversion units are controlled to have a predetermined relationship with a frequency of a noise source occurring during an operation of reading the image signals.

* * * * *